United States Patent
Patwardhan et al.

(10) Patent No.: US 9,402,340 B2
(45) Date of Patent: Aug. 2, 2016

(54) CLOSING WHEEL ADJUSTMENT

(71) Applicant: AGCO Corporation, Duluth, GA (US)

(72) Inventors: Ranjit Patwardhan, Hesston, KS (US); Monte Rans, Hesston, KS (US)

(73) Assignee: AGCO CORPORATION, Duluth, GA (US)

( * ) Notice: Subject to any disclaimer, the term of this patent is extended or adjusted under 35 U.S.C. 154(b) by 182 days.

(21) Appl. No.: 14/369,303

(22) PCT Filed: Dec. 26, 2012

(86) PCT No.: PCT/US2012/071631
§ 371 (c)(1),
(2) Date: Jun. 27, 2014

(87) PCT Pub. No.: WO2013/101816
PCT Pub. Date: Jul. 4, 2013

(65) Prior Publication Data
US 2015/0000940 A1    Jan. 1, 2015

Related U.S. Application Data

(60) Provisional application No. 61/580,364, filed on Dec. 27, 2011.

(51) Int. Cl.
*A01C 5/06*    (2006.01)
(52) U.S. Cl.
CPC ...................................... *A01C 5/066* (2013.01)
(58) Field of Classification Search
CPC .................................. A01C 5/06; A01C 5/066
See application file for complete search history.

(56) References Cited

U.S. PATENT DOCUMENTS

| | | | | |
|---|---|---|---|---|
| 4,009,668 A * | 3/1977 | Brass | ........................ | A01C 5/06 111/137 |
| 4,726,304 A * | 2/1988 | Dreyer | ...................... | A01C 5/06 111/150 |
| 4,846,084 A * | 7/1989 | Sigle | ......................... | A01C 5/06 111/136 |
| 5,497,717 A * | 3/1996 | Martin | .................... | A01C 5/066 111/140 |
| 6,135,037 A * | 10/2000 | Juptner | ................... | A01C 7/208 111/139 |
| 6,148,747 A * | 11/2000 | Deckler | ................... | A01C 5/06 111/137 |
| 7,152,541 B2 * | 12/2006 | Ptacek | .................... | A01C 19/00 111/185 |
| 7,975,629 B1 * | 7/2011 | Martin | .................... | A01C 5/066 111/140 |
| 2009/0056962 A1 * | 3/2009 | Martin | .................... | A01C 5/066 172/551 |
| 2009/0235853 A1 * | 9/2009 | Schaffert | ............... | A01C 5/064 111/163 |
| 2011/0005439 A1 | 1/2011 | Patwardhan et al. | | |

FOREIGN PATENT DOCUMENTS

EP    0 140 263 A1    5/1985
FR    2 865 345 A1    7/2005

OTHER PUBLICATIONS

European Patent Office, International Search Report for International Application No. PCT/US2012/071631, mailed Apr. 24, 2013.

* cited by examiner

*Primary Examiner* — Matthew D Troutman

(57) ABSTRACT

A planter may be disclosed, the planter may comprise a handle, a first shaft, a second shaft, and a link. The first shaft may be operatively connected to the handle, link, or second shaft. The link may be arranged to translate rotational motion of the first shaft to the second shaft.

13 Claims, 3 Drawing Sheets

CLOSING WHEEL ADJUSTMENT

CROSS REFERENCE TO RELATED APPLICATIONS

This application claims priority to U.S. Provisional Application No. 61/580,364 filed Dec. 27, 2011, entitled "CLOSING WHEEL ADJUSTMENT".

BACKGROUND OF THE INVENTION

1. Field of Invention

This invention relates generally to a furrow closing mechanism on agricultural planters, and more particularly to a planter having adjustable furrow closing wheels.

2. Description of Related Art

Planters with a plurality of seed meters may plant seeds upon or in the ground at various depths and spacings. A furrow opener, such as a double-disc opener having a pair of downwardly and slightly forwardly converging discs, creates a furrow in the soil for receiving seeds dropped through a dispensing tube. Gauge wheels provide support for the planter and limit the depth of penetration of the furrow opener into the ground. A pair of closing wheels attached at the rear of the planter closes the seed furrow after the seeds have been deposited therein. Some designs mount the closing wheels on a single shaft while other designs position the closing wheels in a staggered arrangement using with each wheel on a different shaft.

It is desirable to provide an adjustment mechanism so that the angle of the closing wheels can be changed to close the furrow less or more aggressively for different soil types and field conditions. It would therefore be desirable to have a closing wheel adjustment mechanism for planters having closing wheels using single or dual shaft designs that changes the angle of the closing wheels.

SUMMARY OF THE INVENTION

In one embodiment, the invention is directed to a furrow closing apparatus for use with an agricultural planter that opens a furrow in the ground and deposits seeds in the furrow as the planter moves in a forward direction of travel over the ground. The apparatus includes a handle, a first shaft for a first closing wheel, a second shaft for a second closing wheel, and a link connecting the first and second shafts. The handle may be operatively connected to the first shaft or the link to rotate the first shaft. The link translates rotational motion of the first shaft to the second shaft.

Yet another embodiment may comprise a method. The method may include connecting a first shaft to a second shaft with a link, each shaft operatively connected to at least one closing wheel and operatively connecting a handle to the first shaft such that repositioning of handle causes a change of an angle of each closing wheel relative to each other. Operatively connecting the first shaft to the handle may comprise operatively connecting the handle to the link such that when the handle is repositioned the link may reposition the first shaft and the second shaft.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXAMPLE EMBODIMENTS

Figure 1:
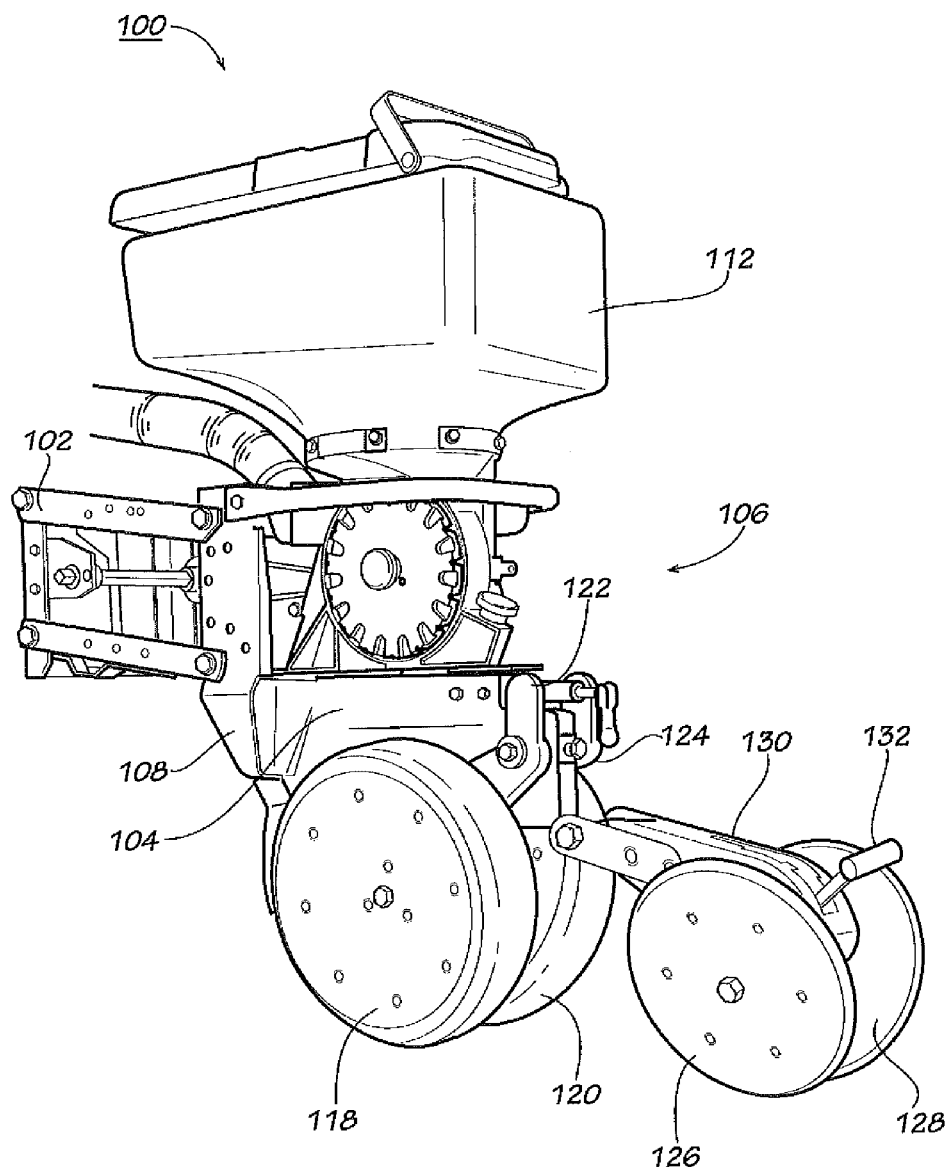
FIG. 1 is a diagram of a single row planter.

The following description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following example embodiments do not limit the disclosure. Instead, the proper scope is defined by the appended claims.

Planters may be used within an agricultural environment to facilitate placing seed and fertilizer in the ground. The planter may be connected to a tractor and have seed/fertilizer hoppers. The planter may create a furrow for the seed/fertilizer. The planter may use gauge wheels to set the depth of the furrow. After the seed or fertilizer is placed in the furrow, the planter may close the furrow with closing wheels.

While the drawings illustrate and the specification describes certain embodiments, it is to be understood that such disclosure is by way of example only. There is no intent to limit the principles disclosed to the particular disclosed embodiments. References hereinafter made to certain directions, such as, for example, "front" and "rear" are made as viewed from the side of a planter.

FIG. 1 illustrates a planter 100. Planter 100 may be a single row planter adapted for mounting on a hitch of a tractor or may comprise a pull-type implement with its own set of transport wheels. Planter 100 may include some suitable attachment mechanism for attaching it to a tool bar (not shown). An example of such an attachment mechanism comprises a four-bar linkage 102 and a pair of U-bolts (not shown) for fastening linkage 102 to the tool bar. Planter 100 may comprise a frame 104 attached to and projecting rearwardly from linkage 102. Frame 104 may comprise a number of components mounted thereon as hereinafter explained.

As shown in FIG. 1, planter 100 may include frame 104 and an input meter 106 attached to the frame 104. The planter 100 may include a horse collar 108 for further securing planter 100 to the tool bar and for protecting meter 106. Planter 100 may be powered or driven by individual mechanical, electrical, hydraulic or pneumatic motors. One or more planters 100 may be driven by a common motor. For example, planter 100 may be powered by a hydraulic drive or motor that powers a main line shaft of planter 100. Alternatively, planter 100 may be driven by a transmission where planter 100's wheels contacting the ground drive the main line shaft.

For each meter 106, the frame 104 of planter 100 may carry a generally upright dispensing tube 110 and may be adapted for receiving inputs such as seeds from meter 106. Meter 106 may receive seeds from a source of supply, such as a seed box or hopper 112 that may also be mounted on frame 104. Seeds that are received by meter 106 from hopper 112 may be singulated and dropped through dispensing tube 110 for deposit into the ground as planter 100 advances.

As is known in the art, a suitable furrow opener (not shown) may also be carried by frame 104 for opening a furrow in the soil for receiving seeds dropped through a dispensing tube. The furrow opener may take a variety of different forms. For example, the furrow opener may take the form of a double-disc opener having a pair of downwardly and slightly forwardly converging discs rotatably mounted on frame 104. The dispensing tube may project downwardly between the pair of discs and may have a lower discharge end facing generally rearwardly and downwardly to discharge the seeds into the furrow.

A first gauge wheel 118 and a second gauge wheel 120 may be disposed on opposite sides and may be rotatably mounted on frame 104, via a first gauge wheel arm assembly 122 and a second gauge wheel arm assembly 124, and may provide support for frame 104. The first and second gauge wheels 118, 120 may limit the depth of penetration of the furrow opener into the ground. Frame 104 may swing up and down relative to the tool bar via a four-bar linkage 102, and the downward movement may be limited by first and second gauge wheels 118, 120 as they roll along the ground. A pair of closing wheels 126 and 128 may be attached to the rear of frame 104 and may function to close the seed furrow after seeds have been deposited therein by dispensing tube 110. First and second closing wheels 126, 128 may be attached to planter 100 by a second frame 130. The vertical position of first gauge wheel 118 and second gauge wheel 120 relative to frame 104 and the furrow opener may be adjusted. One of the closing wheels 126, 128 may be positioned closer to the front of the planter 100 than the other of the closing wheels 128, 126.

Figure 2:
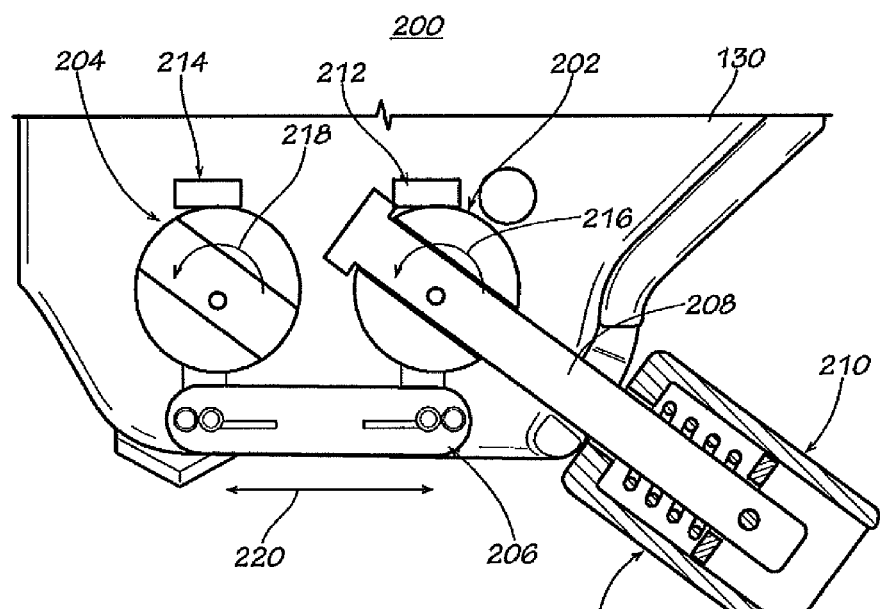
FIG. 2 shows an adjustable closing wheel assembly used with the planter of FIG. 1.

FIG. 2 shows an assembly 200 for adjusting first closing wheel 126 and second closing wheel 128. Assembly 200 may comprise second frame 130, handle 132, a first shaft 202, a second shaft 204, and a link 206 connecting the first and second shafts 202, 204. Handle 132 may be connected to first shaft 202 by a rod 208 penetrating first shaft 202 (e.g., via a first hole 302 in FIG. 3) or other connecting structures. Handle 132 may be secured in place by a spring loaded cap 210. Spring loaded cap 210 may comprise protrusions or detrusions configured to engage detrusions or protrusions located on second frame 130.

Link 206 may be connected to first shaft 202 and second shaft 204 with a first pin 212 and a second pin 214. Each pin may penetrate its respective shaft (e.g., via first pin 212 and a second hole 304 in FIG. 3). Link 206 may be arranged to translate rotational motion of first shaft 202 to second shaft 204. For example, as handle 132 is moved, first shaft 202 rotate counter clockwise or clockwise as indicated by a first arrow 216. This rotation is translated to second shaft 204, as indicated by a second arrow 218, by a lateral motion of link 206 as indicated by a third arrow 220.

Link 206 may be a solid member such as, for example, a steel or an aluminum bar. Alternately, link 206 may be a flexible member such as, for example, rubber member, a spring, or a hydraulic/pneumatic shock that allows the link 206 to translate rotation motion between first shaft 202 and second shaft 204. The use of a flexible member may allow first shaft 202 and second shaft 204 some freedom of transitory movement while still maintaining a substantially constant relative rotational position of first shaft 202 and second shaft 204. For example, a flexible link may allow first shaft 202 to move slightly if, for example, first closing wheel 126, attached to first shaft 202, hits a rock. If first closing wheel 126 hits a rock causing transitory movement, second closing wheel 126, attached to second shaft 202, may remain in a relatively undisturbed position due to link 206 being flexible.

During operation, link 206 may be positioned in a first position by the operator to cause the first and second closing wheels 126, 128 to be aligned at a first angle relative to one another and the ground. If the operator desires to change the angle, link 206 may be moved to a second position causing the first closing wheel 126 and second closing wheel 128 to be aligned at a second angle relative to one another and the ground, where the second angle is different than the first angle. Movement of link 206 may also cause a camber of first closing wheel 126 and second closing wheel 128 to change. In addition, movement of link 206 may cause a toe angle of first closing wheel 126 and second closing wheel 128 to change. For instance, moving link 206 from the first position to the second position may increase or decrease the toe-in and/or camber of first closing wheel 126 and/or second closing wheel 128.

Furthermore, movement of link 206 may be controlled in substantially real time. For example, handle 132 may be connected to an actuator that may be controllable from an operator compartment of a tractor. During use, a user may monitor the performance of planter 100. Depending on how planter 100 is performing, the user may adjust first closing wheel 126 and second closing wheel 128 without having to stop the tractor by controls that may be connected to the actuator.

Figure 3:
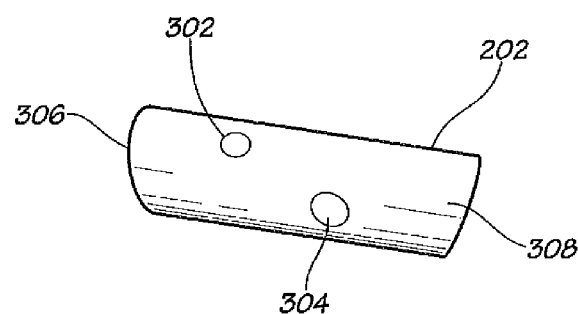
FIG. 3 shows a shaft of the closing wheel assembly of FIG. 2.

As shown in FIG. 3, first shaft 202 may comprise a first beveled surface 306 and a second beveled surface 308. An axis of rotation of first shaft 202 may be perpendicular to second frame 130. Thus, when first shaft 202 is rotated, an angle of first beveled surface 306 and second beveled surface 308 relative to beveled surfaces on second shaft 204 and the ground may change. In addition, while FIG. 3 shows only one hole (e.g., first hole 302) for a pin (e.g., first pin 212) for connecting link 206 to first shaft 202, embodiments may comprise first shaft 202 and second shaft 204 having multiple holes for attaching link 206 to first shaft 202 or second shaft 204. The multiple holes may allow a user to differ the orientation of the shafts' beveled surfaces to one other. For instance, multiple holes in first shaft 202 may allow beveled surfaces on first shaft 202 and second shaft 204 to be aligned in a same direction or different directions when link 206 is in a first position.

Figure 4:
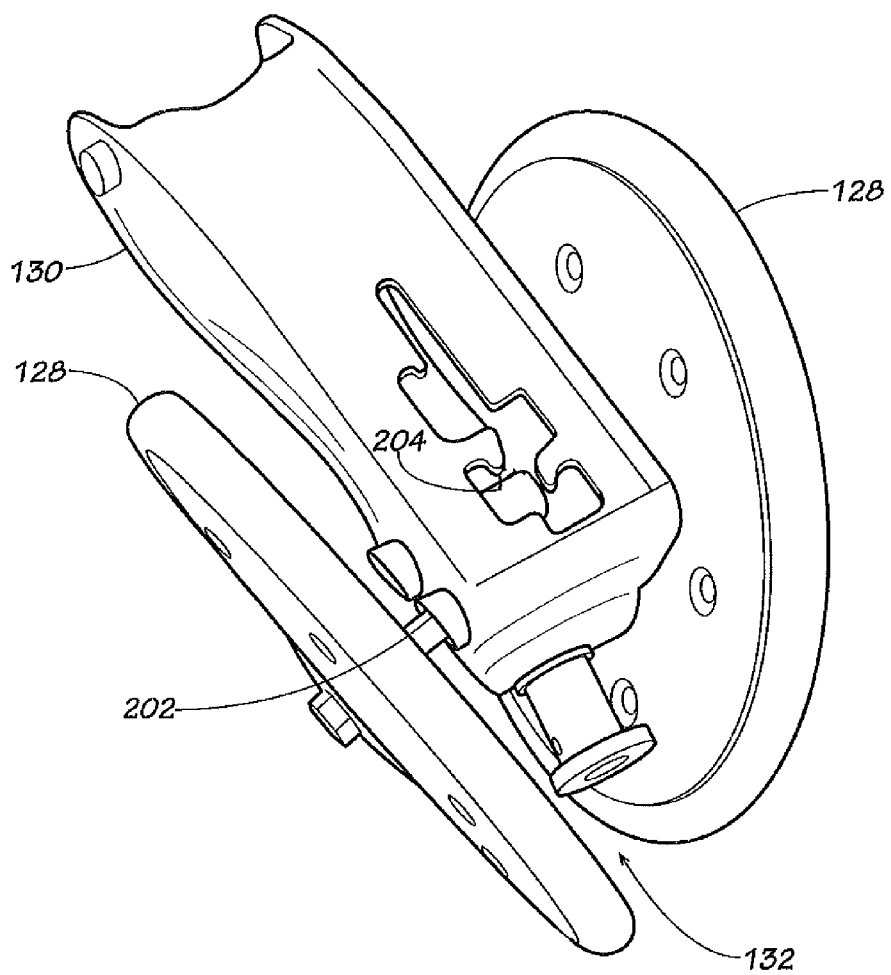
FIG. 4 shows closing wheels connected to different shafts.

In addition, spindle receivers may be located at first beveled surface 306 and second beveled surface 308. The spindle receivers may receive spindles that may be used to connect first closing wheel 126 and second closing wheel 128 to first shaft 202 or second shaft 204. Furthermore and as shown in FIG. 4, embodiments may comprise only one closing wheel connected to each shaft. For example first closing wheel 126 may be connected to first shaft 202 and second closing wheel 128 may be connected to second shaft 204.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. An apparatus for use with a first closing wheel and a second closing of an agricultural implement, the apparatus comprising:

a handle;

a first shaft operatively connected to the handle, the first shaft having the first closing wheels attached thereto;

a second shaft having the second closing wheel attached thereto; and a link arranged to translate rotational motion of the first shaft to the second shaft.

2. The apparatus of claim 1, wherein the first shaft being operatively connected to the handle comprises the handle being connected to the link such that when the handle is repositioned the link will reposition the first shaft and the second shaft.

3. The apparatus of claim 1, wherein the first shaft and the second shaft each comprise a beveled surface at opposite ends of the first shaft and the second shaft, an angle of each of the beveled surfaces relative to a ground surface changing relative to a change of a position of the handle.

4. The apparatus of claim 3, wherein the first shaft and the second shaft each comprise a pair of spindle receivers, one spindle receiver connected to each of the beveled surfaces.

5. The apparatus of claim 1, wherein a first position of the link is configured to cause a pair of closing wheels to be aligned at a first angle relative to one another and a ground surface.

6. The apparatus of claim 5, wherein a second position of the link is configured to cause the pair of closing wheels to be aligned at a second angle relative to one another and the ground surface, the first angle being different than the second angle.

7. An apparatus comprising:
a planter comprising:
a handle;
a first shaft operatively connected to the handle;
a second shaft; and
a link arranged to translate rotational motion of the first shaft to the second shaft, wherein a first position of the link is configured to cause a pair of closing wheels to be aligned at a first angle relative to one another and a ground surface.

8. The apparatus of claim 7, wherein a second position of the link is configured to cause the pair of closing wheels to be aligned at a second angle relative to one another and the ground surface, the first angle being different than the second angle.

9. The apparatus of claim 7, wherein the first shaft being operatively connected to the handle comprises the handle being connected to the link such that when the handle is repositioned the link will reposition the first shaft and the second shaft.

10. The apparatus of claim 7, wherein the first shaft and the second shaft each comprise a beveled surface at opposite ends of the first shaft and the second shaft, an angle of each of the beveled surfaces relative to a ground surface changing relative to a change in a position of the handle.

11. The apparatus of claim 10, wherein the first shaft and the second shaft each comprise a pair of spindle receivers, one spindle receiver connected to each of the beveled surfaces.

12. A method comprising:
connecting a first shaft to a second shaft with a link, each shaft operatively connected to at least one closing wheel; and
operatively connecting a handle to the first shaft such that repositioning of handle causes a change of an angle of each closing wheel relative to each other.

13. The method of claim 12, wherein operatively connecting the first shaft to the handle comprises operatively connecting the handle to the link such that when the handle is repositioned the link will reposition the first shaft and the second shaft.

* * * * *